March 24, 1970 J. A. PAWLOSKI Re. 26,834
FLUID OPERATED HAND TOOL
Original Filed Nov. 4, 1964
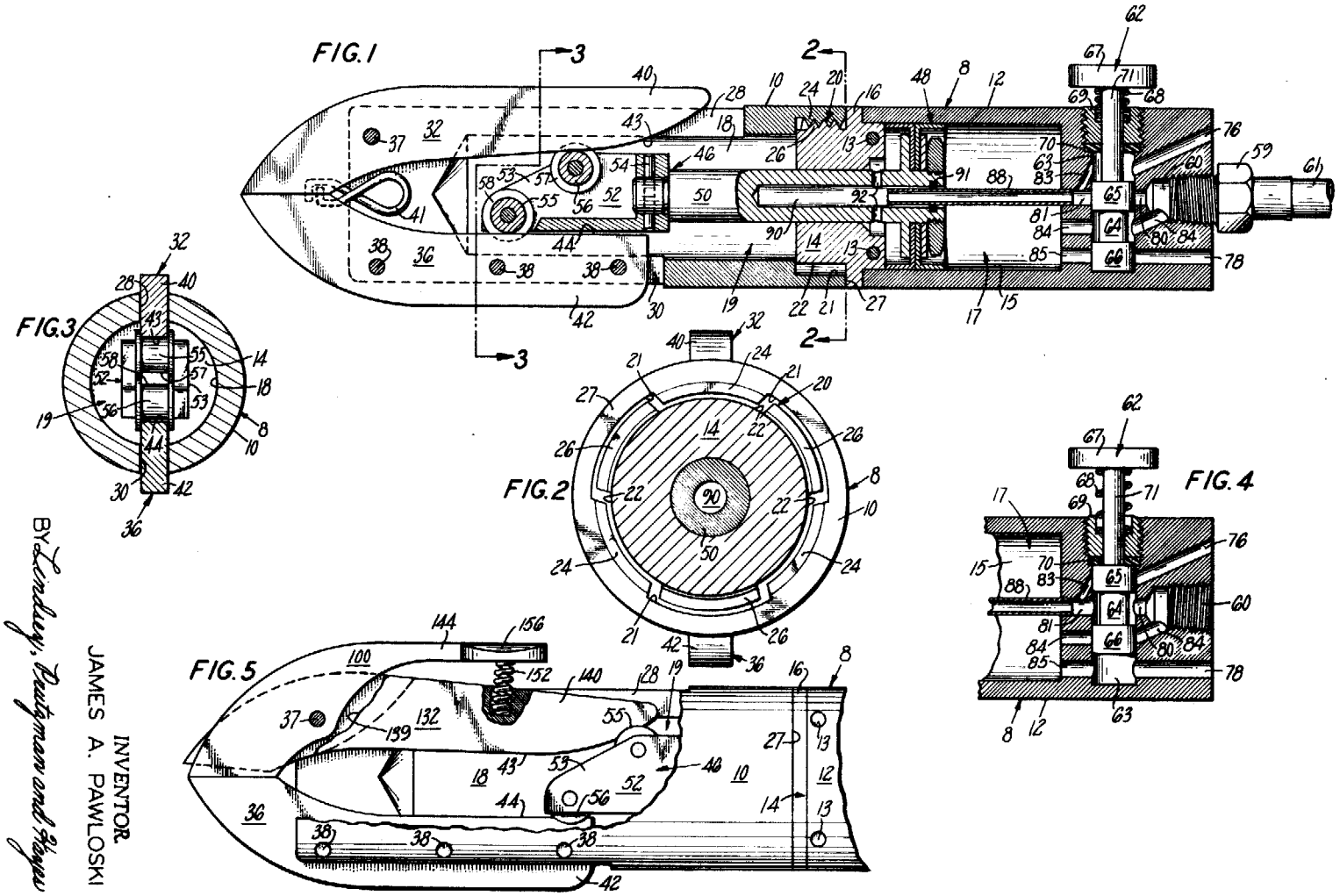
INVENTOR.
JAMES A. PAWLOSKI
BY Lindsey, Prutzman and Hayes
ATTORNEYS United States Patent Office Re. 26,834
Reissued Mar. 24, 1970

26,834
FLUID OPERATED HAND TOOL

James A. Pawloski, Box 158,
East Woodstock, Conn. 06244

Original No. 3,269,223, dated Aug. 30, 1966, Ser. No. 408,900, Nov. 4, 1964. Application for reissue Oct. 6, 1967, Ser. No. 676,659
Int. Cl. B25b 7/12
U.S. Cl. 81—1 15 Claims

Matter enclosed in heavy brackets [ ] appears in the original patent but forms no part of this reissue specification; matter printed in italics indicates the additions made by reissue.

*ABSTRACT OF THE DISCLOSURE*

*A fluid operated tool having a power pack portion 8 including a housing 12 in which there is defined a piston chamber 17 in which a piston 48 is slidably disposed for movement between an operative and inoperative position. The arrangement is such that the piston 48 partitions the housing 12 into two chamber portions (i.e. the forward end and rear end of the piston chamber 17). A piston rod 50 having a bore 90 extends through an opening formed in end wall or plug 14. A control means including a valving means 62 disposed in a valving chamber 63 is provided for selectively admitting fluid under pressure into one of the chamber portions on one side of the piston and exhausting the fluid from the other chamber portion on the other side of the piston 48. Direction of fluid flow is attained by first passage means 80 and 84 connecting the valving chamber to a source of pressurized fluid. Second passage means 81, 88 and 84 connect the first passage means to each of the respective chamber portions through the valving chamber 63. And third passage means 83, 76 and 78 function to selectively exhaust each of the respective chamber portions to the atmosphere through the valving chamber 63. The valve 62 is constructed so that in one position the respective passages are placed in communication so that fluid under pressure is introduced into one chamber portion to act on one side of the piston to cause displacement thereof as the fluid in the other chamber portion on the other side of the piston is exhausted to the atmosphere. The arrangement is such that the passage 88 functions to both supply and exhaust fluid from the forward chamber through the valve chamber 63.*

*Operatively associated with the piston rod 50 of the power pack unit are a plurality of different head constructions which are adapted to be detachably connected to the unit 8, the particular head construction depending upon the particular operation to be performed by the tool.*

*This application is a reissue application of U.S. Letters Patent No. 3,269,223 granted Aug. 30, 1966 on application S.N. 408,900 filed Nov. 4, 1964.*

The present invention relates to fluid operated hand tools and more particularly to fluid operated hand tools having opposed jaws useful for clamping, gripping, swaging or the like.

A principal aim of the present invention is to provide an improved pneumatically operable hand tool having a compact and lightweight assembly and a clamping, gripping or swaging action of improved capabilities.

Another aim of the present invention is to provide a pneumatically operable hand tool of the type described which is useful with sources of compressed air conventionally available at manufacturing and repair facilties.

A further aim of the present invention is to provide an improved fluid operated hand tool having detachable jaws that may be easily replaced for selectively adapting the hand tool for different clamping functions and thereby provide a basic hand tool of unusual flexibility.

Another aim of the present invention is to provide a fluid operated hand tool having a combination of parts of low cost manufacture adapted for economical and convenient assembly.

Other objects will be in part obvious and in part pointed out more in detail hereinafter.

The invention accordingly consists in the features of construction, combination of elements and arrangement of parts which will be exemplified in the construction hereafter set forth, and the scope of the application of which will be indicated in the appended claims.

In the drawing:

FIG. 1 is a longitudinal section view, partly broken away, showing an embodiment of the fluid operated hand tool of the present invention with a control button thereof in a fully depressed position;

FIG. 2 is an enlarged transverse section view of the embodiment of the fluid operated hand tool of FIG. 1 showing the cooperative parts of a quick-disconnect thereof in an aligned disconnected relationship;

FIG. 3 is a transverse section view of the embodiment of the fluid operated hand tool of FIG. 1 taken substantially along line 3—3 of FIG. 1;

FIG. 4 is a fragmentary longitudinal section view of the embodiment of the fluid operated hand tool of FIG. 1 showing the control button thereof in a normal or withdrawn position; and FIG. 5 is a fragmentary longitudinal view, partly broken away, illustrating a modified embodiment of the fluid operated hand tool of the present invention.

Referring now to the drawing in detail wherein like numbers represent like parts, a first embodiment of a fluid operated hand tool of the present invention is illustrated in FIGS. 1–4. This embodiment is shown with an elongated generally cylindrical tool housing 8 having a diameter suitable for convenient manual manipulation of the tool and comprising separable forward and rear housing portions 10, 12 respectively. A plug or bushing 14 is fixed within the forward end of a longitudinally extending forwardly opening bore 15 in the rear housing portion 12 by a pair of transverse pins 13 and with its annular flange 16 abutting the forward end of the rear housing portion. The plug 14 accordingly encloses a longitudinally extending operating cylinder 17 of the bore 15. The plug 14 is adapted for receipt within the rearward end of a longitudinally extending rearwardly opening bore 18 in the forward housing portion 10 and is accordingly adapted to enclose a longitudinally extending operating cylinder 19 of the bore 18. In addition to providing an end cap for each of the bores 15, 18, the plug 14 cooperates with the rear end of the forward housing portion 10 to provide a quick-disconnect attachment 20 between the housing portions. In the illustrated embodiment the quick-disconnect 20 is provided by a breech lock, best seen in FIG. 2, comprising angularly spaced axially extending grooves or slots 21, 22 and intermediate threaded portions 24, 26 on the forward housing portion 10 and plug 14 respectively. The threaded portions and axial slots thereby cooperate to provide for attaching the housing portions by inserting the forward housing portion longitudinally onto the plug 14 and rotating the forward housing portion relative to the plug until the rear end 27 of the forward housing portion 10 abuts the annular flange 16 and thereby securely locks the housing portions together.

The forward housing portion 10 is slotted from its forward end to provide a pair of diametrically opposed slots 28, 30 opening into the operating cylinder 19, and a jaw assembly comprising a pair of jaw plates 32, 36 are mounted within the slots 28, 30, respectively. The jaw 32 is mounted within the slot 28 on a transverse pivot pin 37, and the opposing jaw 36 is fixed within the slot 30 by a series of laterally extending retaining pins 38. The jaw plates are provided with arched lever arms 40, 42 having opposed inner edge portions 43, 44, respectively, disposed within the forward operating cylinder 19. A torsion spring 41 received in part within the slot forwardly of the operating cylinder 19 has opposed offset ends received within conforming slots in the jaws to provide for pivoting the jaw 32 to its normal or open position.

The pivotal jaw 32 is actuated against the bias of the torsion spring 41 for clamping, gripping, swaging or the like by a ram 46 having a push rod 50 longitudinally reciprocable within a central opening in the plug 14, an actuating piston 48 fixed to the rear end of the push rod for operation within the operating cylinder 17 and a jaw operator 52 fixed to the forward end of the push rod for longitudinal movement within the operating cylinder 19. The jaw operator 52 includes a roller support 53 fixed on the end of the push rod by a transverse pin 54 and a pair of axially offset and diametrically related parallel rollers 55, 56 rotatable on the support 53 for engagement with the jaw edge portions 43, 44, respectively. The edge portion 43 of the pivotal jaw 32 is convexly curved to provide a camming edge whereas the edge portion 44 of the stationary jaw 36 extends parallel to the axis of reciprocable movement of the ram 46 to provide a guide or support for the ram. Thus, upon forward movement of the ram 46 from its withdrawn position the jaw 36 functions as a lateral guide or support for the ram and the roller 55 functions to pivot the jaw 32 to provide cooperative action between the jaw faces for crimping, swaging, gripping or the like.

To facilitate operative alignment of the jaws with the rollers 55, 56 when assembling the housing portions 10, 12 and to further assist in guiding the reciprocating ram 46, the rollers are provided with spaced annular flanges forming intermediate peripheral recesses or slots 57, 58 for receiving the rearwardly extending lever arms of the jaws. An operator is thereby assured of having the rollers and jaws in aligned relationship by simply fitting the opposed jaw edges within the peripheral recesses 57, 58, when the forward housing portion is assembled with the rear housing portion, for which purpose the ram 46 may be extended to enable the forward housing portion to be inserted onto the ram before the forward housing portion 10 is inserted onto the plug 14.

For selectively extending and retracting the ram 46 a control valve is positioned in the rear housing portion 12 rearwardly of the operating cylinder 17 is adapted for connection to an external source of, for example, compressed air, as by means of a flexible conduit 61 having a connector 59 threaded into an inlet or supply port 60 in the rear face of the tool housing. The control valve includes a spool valve 62 reciprocable within a radial valve bore 63 and having a pair of spaced lands 65, 66 and an intermediate segment 64 of reduced diameter which cooperate to provide four-way valving action for selectively connecting the ends of the operating cylinder 17 with the supply port 60 and to exhaust. The spool valve 62 is provided with a stem portion 71 having a push button 67 at its outer end for depressing the valve against the bias of a compression spring 68 interposed between the push button and a cap 69 threaded into an enlarged outer end of the bore 63 and securing a valve seal 70 therein. The ends of the spool valve operating chamber are connected to the atmosphere by exhaust passages 76, 78 to provide a balanced valve action, and accordingly the spool valve 62 can be easily depressed with the button 67 and when released is quickly returned to its normal position by the compression spring 68. A first supply passage 80 intersecting the valve bore 63 extends between the supply port 60 and the operating cylinder 17 coaxially with the cylinder 17. The forward end portion 81 of this supply passage 80 is also connected to the upper end of the valve operating chamber by a diagonal exhaust passage 83 and accordingly also functions as an exhaust passage adapted for communication with the exhust passage 76 when the valve is depressed. A second supply passage 84 intersecting the valve bore 63 at a point offset from the central supply passage 80 connects the supply port 60 with the rear end of the cylinder 17 for supplying pressure fluid to the rear end of the cylinder when the spool valve is depressed. A second longitudinally extending passage 85 connecting the rear end of the cylinder 17 with the lower end of the valve operating chamber functions as an exhaust passage adapted for communication with the exhaust passage 78 when the spool valve is released.

A supply and exhaust tube 88 is provided for establishing fluid communication between the forward end of the operating cylinder 17 and the passage 81, for which purpose the forward end of the tube 88 is fixed within the passage 81 and is received within a longitudinally extending rearwardly opening enlarged bore 90 in the push rod 50. A seal 91 within the enlarged bore 90 and encircling the tube 88 provides for sealing the bore 90 from the rear end of the operating cylinder 17 and a pair of diametrically opposed radially extending passages or orifices 92 in the push rod provide for connecting the enlarged bore 90 with the forward end of the operating cylinder 17. Accordingly, with the spool valve in its normal or withdrawn position, as seen in FIG. 4, the forward end of the operating cylinder 17 is connected to the supply port 60 and the rear end of the operating cylinder 17 is connected to exhaust to effect withdrawal of the ram. With the spool valve depressed, as seen in FIG. 1, the rear end of the operating cylinder 17 is connected to the supply port 60 and the forward end of the operating cylinder is connected to exhaust to extend the ram 46. With the ram fully extended, as shown in FIG. 1, the forward end of the supply and exhaust tube is positioned rearwardly of the orifices 92 to provide direct fluid connection therebetween and to thereby provide for initial rapid withdrawal of the ram. When the ram is withdrawn from its fully extended position, the fluid flow is restricted at an increasing rate by the annular conduit surrounding tube 88 to control the rate of withdrawal of the ram. Of course, upon extending the ram this fluid restriction decreases to ensure quick and complete operation of the pivotal jaw 32 without at the same time causing undue impact with the workpiece or with the stationary jaw 36.

A modified jaw assembly illustrated in FIG. 5 is constructed for initially gripping or holding a workpiece before the pivotal jaw 132 is actuated. For this purpose, an auxiliary jaw 100 is mounted on the pivot pin 37 of the pivotal jaw 132 within a recess 139 formed on the pivotal jaw plate 132. The auxiliary jaw 100 is provided with a rearwardly extending lever arm 144 spaced outwardly of the rearwardly extending lever arm 140 of the jaw 132 and is biased into engagement with the stationary jaw 36 by a compression spring 152 mounted between the auxiliary jaw 100 and the pivotal paw 132. The spring also functions to bias the pivotal jaw 132 to its retracted position. The auxiliary jaw 100 may be provided with a button 156 to facilitate retraction of the auxiliary jaw and thereby assist in the manual insertion and accurate positioning of the workpiece between the auxiliary and stationary jaws 100, 36.

Thus it can be seen that the fluid operated hand tool of the present invention can be easily manipulated to provide a clamping, gripping or swaging function or the life of improved capabilities with a conventional source of compressed air. Additionally, the hand tool of the present invention is adapted for securely and accurately holding a workpiece prior to actuation of the main jaws and is adapted for selective attachment of the jaws in accordance with each particular operation.

As will be apparent to persons skilled in the art, various modifications and adaptions of the structure above described will become readily apparent without departure from the spirit and scope of the invention, the scope of which is defined in the appended claims.

I claim:

[1. A fluid operated hand tool comprising an elongated manually manipulatable tool housing having separable forward and rear housing portions with quick-disconnect means for detachable connection thereof, a pair of forwardly extending cooperating jaws mounted on the forward housing portion, at least one of the jaws being mounted for pivotal movement about a laterally extending axis for cooperative action with the other jaw, said jaws having rearwardly extending lever arms with opposed inner edge portions recivable within the forward housing portion, a longitudinally extending operating cylinder in the rear housing portion, an actuating piston longitudinally reciprocable within the operating cylinder, a rod fixed to the piston projecting forwardly thereof, a pair of rollers supported on the rod engageable with said opposed inner edge portions of the lever arms respectively for effecting operation of the jaws upon longitudinal movement of the actuating piston, at least one of the rollers having an annular groove adapted for receiving the edge portion of the respective lever arm for maintaining the rollers in operative alignment with the lever arms, and manually operable fluid valve means in the rear housing portion rearwardly of the operating cylinder for controlling the longitudinal movement of the piston.]

2. A fluid operated hand tool comprising an elongated manually manipulatable tool housing having forward and rear housing portions with quick-disconnect means for detachable connection thereof, a longitudinally extending operating cylinder in the rear housing portion, an actuating piston longitudinally reciprocable within the operating cylinder, a pair of cooperating jaws mounted on the forward housing portion, one of said jaws being pivotally mounted on the forward housing portion and the other of said jaws being fixed to the forward housing portion, the jaws having rearwardly extending lever arms with opposed inner edge portions receivable within the forward housing portion, the opposed edge portion of the pivotal jaw being inclined to the longitudinal axis of the piston to provide a jaw camming edge, the opposed edge portion of the fixed jaw being substantially parallel to the longitudinal axis of the piston, a rod fixed to the piston projecting forwardly thereof, roller means on the rod engageable with said opposed edge portions of the lever arms respectively for operating the jaws upon longitudinal movement of the actuating piston, and manually operable fluid valve means in the rear housing portion rearwardly of the operating cylinder for controlling the longitudinal movement of the piston.

3. The fluid operated hand tool of claim 2 wherein the roller means includes a pair of rollers mounted on the rod for rotation about parallel laterally extending axes for engagement with the opposed inner edge portions of the lever arms respectively, with one of said rollers positioned forwardly of the other, and with at least one of the rollers having a peripheral groove for receiving the edge portion of the respective lever arm.

4. A fluid operated hand tool comprising an elongated manually manipulatable tool housing, a pair of main jaws mounted on a forward end portion of the housing for extension forwardly thereof, one of said main jaws being fixed to the housing and the other of said main jaws being mounted on the housing for pivotal movement about a laterally extending axis between open and closed positions, an auxiliary jaw supported on the forward end portion of the housing adjacent the pivotal main jaw for pivotal movement independently thereof for cooperative engagement with the fixed main jaw, resilient means urging the auxiliary jaw into engagement with the fixed jaw, and manually operable motor means for selectively pivoting the pivotal main jaw between its open and closed positions.

5. A fluid operated hand tool comprising an elonagted manually manipulatable tool housing having diametrically opposed slots extending longitudinally from the forward end thereof, a pair of opposed main jaws mounted within the slots respectively for extension forwardly of the housing, one of said main jaws being fixed within its respective slot and the other of said main jaws being mounted for pivotal movement about a laterally extending axis within its respective slot between open and closed positions, said pivotal main jaw having a rearwardly extending lever arm with an inner edge portion receivable within the housing, an auxiliary jaw pivotally mounted in side-by-side relationship with the pivotal main jaw for cooperative action with the fixed main jaw for holding a workpiece, the auxiliary jaw having a rearwardly extending lever arm outwardly of the lever arm of the pivotal main jaw, spring means urging the auxiliary jaw into cooperative action with the fixed main jaw, and manually operable motor means for engaging the inner edge portion of the pivotal main jaw for selectively operating the pivotal main jaw between its open and closed positions.

[6. A fluid operated hand tool adapted to be connected to a source of pressurized fluid comprising an elongated tool housing having forward and rear housing portions, a pair of cooperating jaws mounted on the forward housing portion for extension forwardly thereof, the jaws having rearwardly extending lever arms with opposed inner edge portions within the forward housing portion, a longitudinally extending operating cylinder in the rear housing portion; a ram longitudinally reciprocable within the housing between forward and rear positions engageable with said opposed edge portions for operating the jaws upon longitudinal movement thereof and including an actuating piston longitudinally reciprocable within the cylinder dividing the cylinder into forward and rear chambers; manually operable fluid valve means in the rear housing portion located rearwardly of the operating cylinder for controlling the longitudinal movement of the ram, passage means connecting the fluid valve means with the forward and rear chambers of the operating cylinder for selectively admitting pressure fluid to and exhausting it from the forward and rear chambers thereof and including a fixed longitudinally extending supply and exhaust tube within the operating cylinder having one end in communication with the fluid valve means and the other end in communication with the forward chamber of the opearting cylinder.]

[7. The fluid operated hand tool recited in claim 6 wherein the fluid valve means includes a radially extending valve bore in the rear housing portion rearwardly of the cylinder, a manually operable spool valve reciprocable within the valve bore, a supply port in the rear housing portion rearwardly of and in communication with the valve bore, and supply passage means connecting the valve bore with the supply and exhaust tube and with the rear chamber.]

8. A pneumatically operated hand tool adapted for connection to a source of compressed air comprising an elongated manually manipulatable tool housing having forward and rear housing portions with quick-disconnect means for detachable connection thereof, said forward housing portion having opposed slots at the forward end thereof and said rear housing portion having a longitudinally extending cylinder therein, a pair of cooperating jaws mounted within the opposed slots respectively, one of said jaws being pivotally mounted within its respective slot and the other of said jaws being fixed within its respective slot, said jaws having rearwardly extending lever arms with opposed inner edge portions disposed within the forward housing portion, the edge portion of the pivotal jaw being rearwardly tapered, the edge portion of the fixed jaw being substantially parallel to the longitudinal axis of the cylinder; a ram comprising an actuating piston longitudinally reciprocable within the cylinder dividing the cylinder into forward and rear chambers, a rod fixed to the piston projecting forwardly thereof, and a pair of spaced rollers mounted on the rod for rotation about parallel lateral axes for rolling engagement with the opposed inner edge portions of the lever arms respectively; manually operable valve means in the rear housing portion rearwardly of the piston cylinder for controlling the longitudinal movement of the piston, and a fixed longitudinally extending supply and exhaust tube within the cylinder in communication with the valve means, said ram having a rearwardly opening bore receiving the supply and exhaust tube for connecting the tube with the forward chamber.

[9. A fluid operated hand tool adapted to be connected to a source of pressurized fluid comprising an elongated tool housing having forward and rear housing portions, a pair of cooperating jaws mounted on the forward housing portion for extension forwardly thereof, the jaws having rearwardly extending lever arms with opposed inner edge portions within the forward housing portion, a longitudinally extending operating cylinder in the rear housing portion; a ram longitudinally reciprocable within the housing between forward and rear positions engageable with said opposed edge portions for operating the jaws upon longitudinal movement thereof and including an actuating piston longitudinally reciprocable within the cylinder dividing the cylinder into forward and rear chambers; manually operable fluid valve means in the rear housing portion rearwardly of the operating cylinder for selectively admitting pressure fluid to and exhausting it from the forward and rear chambers for controlling the longitudinal movement of the ram, a fixed longitudinally extending supply and exhaust tube within the cylinder having one end in communication with the valve means and the other end in communication with the forward chamber, said ram having a central rearwardly opening bore therein receiving the supply and exhaust tube and dimensioned at least in part to provide an annular conduit therearound, and passage means between the annular conduit and the forward chamber, said passage means positioned rearwardly of the forward end of the supply and exhaust tube with the ram in its rear position to effect a restriction of the fluid flow between the supply and exhaust tube and the forward chamber which varies with the position of the ram.]

[10. A fluid operated hand tool comprising an elongated manually manipulatable tool housing having separable forward and rear housing portions, a pair of cooperating jaws mounted on the forward housing portion for extension forwardly thereof, a longitudinally extending operating cylinder in the rear housing portion, an actuating piston longitudinally reciprocable within the operating cylinder, manually operable fluid valve means in the rear housing portion located rearwardly of the operating cylinder and supply and exhaust passage means establishing communication with the operating cylinder on oppsite sides of the piston for selectively admitting fluid to and exhausting it from the operating cylinder for controlling the longitudinal movement of the piston, and elongated ram fixed to the piston and extending axially forwardly thereof into the forward housing portion for operating the jaws upon longitudinal movement of the piston, and releasable connecting means for maintaining the forward and rear housing portions in assembled relation and for quick detachment thereof.]

[11. A fluid operated hand tool comprising an elongated manually manipulatable tool housing having forward and rear housing portions, the forward housing portion having a longitudinally extending rearwardly opening bore therein and the rear housing portion having a longitudinally extending forwardly opening bore therein to provide a longitudinally extending operating cylinder, a pair of cooperating jaws mounted on the forward housing portion operable for cooperative action, a double acting piston longitudinally reciprocable within the operating cylinder dividing the cylinder into forward and rear chamber portions, a piston rod projecting forwardly from the piston into the bore of the forward housing piston, a bushing slidably receiving the piston rod and fixed within the forward end of the bore of the rear housing portion for enclosing the forward end of the longitudinally extending operating cylinder, jaw operating means on the forward end of the piston rod for effecting operation of the jaws upon longitudinal movement of the double acting piston; fluid control means including manually operable fluid valve means in the rear housing portion rearwardly of the bore therein for selectively admitting pressure fluid to and exhausting it from the forward and rear chamber portions for fluid operation of the double acting piston in both longitudinal directions, and disconnect means for detachable connection of the forward and rear housing portions for permitting replacement of the forward housing portion.]

[12. A fluid operated hand tool adapted to be connected to a source of pressurized fluid comprising an elongated tool housing having forward and rear housing portions, a pair of jaws mounted on the forward housing portion operable for cooperative action, a longitudinally extending operating cylinder in the rear housing portion, a ram longitudinally reciprocable within the housing between forward and rear positions for operating the jaws upon longitudinal movement therof and including an actuating piston longitudinally reciprocable within the operating cylinder dividing the operating cylinder into forward and rear chamber portions; fluid control means for selectively admitting pressure fluid to and exhausting it from the forward and rear chamber portions for controlling the longitudinal movement of the ram including manually operable fluid valve means in the rear housing portion rearwardly of the operating cylinder and a fixed longitudinally extending supply and exhaust tube within the operating cylinder having one end in communication with the fluid valve means and the other end in communication with the forward chamber portion.]

*13. A fluid operated hand tool adapted to be connected to a source of pressurized fluid comprising an elongated tool housing having forward and rear housing portions, a pair of cooperating jaws mounted on the forward housing portion for extension forwardly thereof, the jaws having rearwardly extending lever arms with opposed inner edge portions within the forward housing portion, a longitudinally extending operating cylinder in the rear housing portion; a ram longitudinally reciprocable within the housing between forward and rear positions engageable with said opposed edge portions for operating the jaws upon longitudinal movement thereof and including an actuating piston longitudinally reciprocable within the cylinder dividing the cylinder into forward and rear chambers; manually operable fluid valve means in the rear housing portion rearwardly of the operating cylinder for selectively admitting pressure fluid to and exhausting it from the forward and rear chambers for controlling the longitudinal movement of the ram, a fixed longitudinally extending supply and exhaust tube within the cylinder, said tube being fixed at one end only and said fixed end being in communication with the valve means and the*

*other end in communication with the forward chamber, said ram having a central rearwardly opening bore therein receiving the supply and exhaust tube and dimension at least in part to provide an annular conduit therearound, and passage means between the annular conduit and the forward chamber, said passage means positioned rearwardly of the forward end of the supply and exhaust tube with the ram in its rear position to effect a restriction, but not a cut-off, of the fluid flow between the supply and exhaust tube and the forward chamber which varies with the position of the ram.*

*14. A fluid-actuated tool adapted to be connected to a source of pressurized fluid comprising:*

*a housing defined by opposed end walls and a connected circumscribing wall to define a piston chamber therein,*

*piston means including a piston head and a connected ram reciprocally mounted within said piston chamber for movement between an extended position and a retracted position,*

*one of said end walls having an opening formed therein through which said ram extends, and said piston head dividing said piston chamber into a pair of expandable chamber portions,*

*control means disposed in the other end portion of said housing for selectively admitting fluid under pressure on one side of said piston head and exhausting the fluid from the other side of said piston head,*

*said control means including a valving chamber,*

*a first passage means connecting said valving chamber in communication with the source of pressurized fluid,*

*a second passage means connecting said first mentioned passage means in communication with each of said chamber portions disposed on either side of said piston head through said valving chamber,*

*a third passage means for connecting each of said chamber portions in communication with the atmosphere through said valving chamber,*

*a valve means disposed within said valving chamber for coordinating the flow of fluid to said chamber portions through said passage means for effecting displacement of said piston head and connected ram between an extended position and a retracted position,*

*said second passage means including a supply and exhaust tube fixed at one end only and said fixed end being connected to said first passage means, and*

*said ram having a longitudinally extending bore formed therein for receiving the other end of said tube whereby the length of said bore is sufficient to receive said other end of said tube in either the extended or retracted position of said ram,*

*and a port means formed in said ram opening to the side of the piston head remote from said first passage means whereby said tube functions as a supply and exhaust tube for one of said chamber portions,*

*and said port means in said ram being located forwardly of said other end of said tube in the extended position of said ram to provide a direct fluid connection between said other end of said tube and said port means and rearwardly of said other end of said tube in the retracted position of said ram whereby the flow of fluid is restricted at an increasing rate upon retraction of said ram but not sealed to control the rate of retraction thereof.*

*15. The invention as defined in claim 14 wherein said tube and fluid inlet are disposed in axial alignment with said valve chamber disposed therebetween.*

*16. The invention as defined in claim 14 wherein said third passage means includes a first exhaust passage and a second exhaust passage connecting said valving chamber to the atmosphere, each of said exhaust passages being connected in communication with one of said chamber portions through said valving means.*

*17. A fluid operated hand tool comprising an elongated manually manipulated tool housing which includes a longitudinally extending operating cylinder,*

*an actuating piston means longitudinally reciprocally mounted within the operating cylinder,*

*said piston means dividing said cylinder into a pair of expandable chamber portions,*

*a ram connected to and extending axially of said piston means for movement therewith between an extended and retracted position,*

*said ram having a longitudinally extending bore therein wherein said bore opens to the rear of said ram, and*

*said ram having its other end extending forwardly of said cylinder,*

*a manually operable fluid valve means disposed in said housing for selectively admitting fluid pressure to and exhausting it from the respective chamber portions of said cylinder for controlling the longitudinal movement of said piston means and connected ram,*

*said valving means including a valving chamber having a supply port adapted to connect to a source of fluid pressure, and said supply porting having a forward end portion,*

*a fixed longitudinally extending supply and exhaust tube disposed with said cylinder, said tube being fixed at one end only,*

*said supply and exhaust tube being axially disposed within said cylinder and said tube having a full open end extending into the rear opening of the bore of said ram, and said tube having its other end connected into communication with the forward end portion of the supply port,*

*the bore of said ram having an internal diameter greater than the external diameter of said supply and exhaust tube to define an annular chamber therebetween,*

*a passageway formed in said ram for connecting said annular chamber in communication with one of said expandable chambers on one side of said piston means,*

*said passageway being disposed in said ram so as to be located forwardly of the full open end of supply and exhaust tube in the extended position of said ram to provide a direct fluid connection between said open end of said tube and said passageway, and rearwardly of said full open end of said supply and exhaust tube in the retracted position of said ram whereby the flow of fluid is restricted at an increasing rate upon retraction of said ram but not sealed to control the retraction rate thereof.*

*18. The invention as defined in claim 17 and including an operating head connected to the end of said housing whereby said operating head is actuated by the extension and retraction of said piston means and connected ram.*

*19. The invention as defined in claim 18 wherein said operating head includes a pair of jaws actuated upon the operation of said piston and connected piston rod.*

*20. The invention as defined in claim 18 and including means for detachably connecting said operating head to the end of said housing.*

*21. The invention as defined in claim 17 and including an operating head adapted to be actuated by movement of said ram between extended and retracted positions thereof.*

*22. The invention as defined in claim 21 wherein said valving chamber includes*

*a second supply passageway in communication with said supply port,*

*said second supply passageway being in communication with the other of said expandable chamber,*

*a first exhaust passageway communicating said supply and exhaust tube with the atmosphere,*

*and a second exhaust passageway connecting said other expandable chamber to atmosphere,*

*and a spool valve disposed in said chamber for valving said passageways so that when fluid pressure is applied to one expandable chamber the other is being exhausted to the atmosphere through its corresponding exhaust passageway.*

References Cited

The following references, cited by the Examiner, are of record in the patented file of this patent or the original patent.

UNITED STATES PATENTS

| | | | |
|---|---|---|---|
| Re. 25,842 | 8/1965 | Keane et al. | 81—301 X |
| 509,265 | 11/1893 | Tweddell et al. | 72—452 |
| 2,396,562 | 3/1946 | Forss | 72—407 |
| 2,612,140 | 9/1952 | Miller | 91—466 |
| 2,709,446 | 5/1955 | Miller | 173—169 X |
| 2,778,259 | 1/1957 | Moir | 81—301 |

| | | | |
|---|---|---|---|
| 2,815,004 | 12/1957 | Droman | 30—228 |
| 3,177,583 | 4/1965 | Fischer | 30—180 |
| 1,987,959 | 1/1935 | Knuuti et al. | 81—9.51 |
| 2,644,142 | 6/1953 | Danberg | 81—5.1 |
| 3,130,484 | 4/1964 | Zdanis. | |
| 2,420,626 | 5/1947 | Stevenson | 92—110 X |

FOREIGN PATENTS

| | | |
|---|---|---|
| 722,160 | 1/1955 | Great Britain. |
| 747,766 | 4/1956 | Great Britain. |

OTHELL M. SIMPSON, Primary Examiner

U.S. Cl. X.R.

72—407, 452; 81—301